(12) United States Patent
Bain et al.

(10) Patent No.: US 11,686,165 B2
(45) Date of Patent: Jun. 27, 2023

(54) COILED TUBING SYSTEM

(71) Applicant: Paradigm Flow Services Limited, Aberdeenshire (GB)

(72) Inventors: Robert Bain, Aberdeenshire (GB); Hugh MacKenzie, Aberdeenshire (GB)

(73) Assignee: PARADIGM FLOW SERVICES LIMITED, Aberdeenshire (GB)

( * ) Notice: Subject to any disclaimer, the term of this patent is extended or adjusted under 35 U.S.C. 154(b) by 0 days.

(21) Appl. No.: 17/271,256

(22) PCT Filed: Aug. 28, 2019

(86) PCT No.: PCT/GB2019/052396
§ 371 (c)(1),
(2) Date: Feb. 25, 2021

(87) PCT Pub. No.: WO2020/044032
PCT Pub. Date: Mar. 5, 2020

(65) Prior Publication Data
US 2021/0190234 A1 Jun. 24, 2021

(30) Foreign Application Priority Data
Aug. 29, 2018 (GB) ..................................... 1814057

(51) Int. Cl.
*E21B 17/20* (2006.01)
*E21B 23/08* (2006.01)
*F16L 1/028* (2006.01)

(52) U.S. Cl.
CPC .............. *E21B 17/20* (2013.01); *E21B 23/08* (2013.01); *F16L 1/028* (2013.01)

(58) Field of Classification Search
CPC .......... E21B 23/08; E21B 23/10; E21B 34/14; E21B 2200/06; E21B 17/20
See application file for complete search history.

(56) References Cited

U.S. PATENT DOCUMENTS

| 4,523,644 A | 6/1985 | Dismukes |
| 5,711,375 A * | 1/1998 | Ravi ....................... E21B 33/13 175/215 |
| 6,296,066 B1 * | 10/2001 | Terry ..................... E21B 17/206 175/320 |

(Continued)

FOREIGN PATENT DOCUMENTS

| CA | 3003706 A1 * | 11/2019 | ......... E21B 33/1216 |
| GB | 2454895 A * | 5/2009 | ........... E21B 17/203 |

(Continued)

*Primary Examiner* — Frederick L Lagman
(74) *Attorney, Agent, or Firm* — William H. Honaker; Dickinson Wright PLLC

(57) ABSTRACT

A coiled tubing system (10) for use in deploying a tubing string (12) into a conduit (14) comprises the tubing string (12) and a fluid discharge apparatus (26) disposed at a distal end of the tubing string (12). The tubing string (12) includes a first tubing portion (28) comprising composite coiled tubing and a second tubing portion (30) comprising metallic coiled tubing. The system (10) is configured to deploy the tubing string (12) and the fluid discharge apparatus (26) into the conduit (14), the fluid discharge apparatus (26) operable to generate pressure pulses which facilitate transport of the tubing string (12) further along the conduit 14.

17 Claims, 5 Drawing Sheets

(56) References Cited

U.S. PATENT DOCUMENTS

| | | | |
|---|---|---|---|
| 6,868,913 B2 * | 3/2005 | Vidrine | E21B 43/10 405/184 |
| 7,036,610 B1 * | 5/2006 | Vail, III | E21B 21/10 175/57 |
| 2002/0007945 A1 | 1/2002 | Neuroth et al. | |
| 2004/0040749 A1 * | 3/2004 | Terry | E21B 17/10 175/325.1 |
| 2009/0260834 A1 | 10/2009 | Henson et al. | |
| 2014/0182857 A1 * | 7/2014 | Klompsma | E21B 43/255 166/310 |
| 2017/0275979 A1 * | 9/2017 | Chalifoux | E21B 43/305 |

FOREIGN PATENT DOCUMENTS

| | | | | |
|---|---|---|---|---|
| GB | 2581801 A * | 9/2020 | | B08B 9/053 |
| GB | 2581959 A * | 9/2020 | | E21B 17/05 |
| KR | 101295800 B1 | 8/2013 | | |
| WO | 0014378 A1 | 3/2000 | | |
| WO | 2014026190 A1 | 2/2014 | | |
| WO | WO-2017122008 A1 * | 7/2017 | | E21B 21/103 |

\* cited by examiner

COILED TUBING SYSTEM

CROSS-REFERENCE TO RELATED APPLICATIONS

The present application claims priority to PCT International Patent Application Serial No. PCT/GB2019/052396 filed Aug. 28, 2019 entitled "Coiled Tubing System," which claims the benefit of GB Patent Application Serial No. 1814057.4 filed Aug. 29, 2018, the entire disclosures of the applications being considered part of the disclosure of this application and hereby incorporated by reference.

FIELD

This relates to a coiled tubing system for deployment into a conduit, in particular but not exclusively, a coiled tubing system for deployment into a fluid conduit for transporting hydrocarbons such as an extended reach horizontal wellbore.

BACKGROUND

In the oil & gas exploration and production industry, in order to access hydrocarbons from a formation, a well borehole ("wellbore") is drilled from surface. The wellbore is then lined with sections of bore-lining metal tubulars, known as casing, and production infrastructure installed to facilitate the ingress of hydrocarbons into the wellbore and transport them to surface.

The development of directional drilling techniques has facilitated the creation of high angle and horizontal wellbores (referred to below collectively as horizontal wellbores) which deviate from vertical and thus permit the wellbore to follow the hydrocarbon bearing formation to a greater extent. Amongst other things, horizontal wellbores beneficially facilitate increased production rates due to the greater length of the wellbore which is exposed to the reservoir.

In view of the benefits of horizontal wellbores, e.g. in increasing production rates, there is a continuing desire to extend the length or "reach" of horizontal wellbores. However, the operation of extended reach horizontal wellbores nevertheless poses a number of significant challenges.

For example, in order to perform an intervention or workover operation in a horizontal wellbore, the intervention tools and equipment must be capable of being advanced along the horizontal portion of the wellbore, which may define a tortuous path over several kilometres.

In the case of mechanical intervention tool systems, the ability to transmit push and/or pull forces to the intervention tool may be severely limited in the horizontal portion of the wellbore, for example due to frictional losses between the intervention tool system and the low side of the wellbore and/or the capstan effect at the heel of the wellbore (that is, the transition from the vertical to the horizontal sections of the wellbore).

Coiled tubing intervention systems—which employ a long continuous length of metal piping wound on a spool—provide the advantage over mechanical intervention tools in that coiled tubing facilitates the transportation of fluid downhole, for example as a cleaning or jetting fluid in a wellbore cleaning operation, as a power fluid to operate fluid-powered downhole tools, or as a treatment fluid, e.g. fracturing fluid, chemical wash operations, or the like. Coiled tubing systems are also particularly, but not exclusively, suited to offshore operations where it is necessary to direct intervention equipment through a flexible marine riser.

However, while coiled tubing intervention systems are used effectively in numerous applications, there are drawbacks with conventional coiled tubing systems. For example, friction between the coiled tubing and the wellbore caused by the weight of the coiled tubing lying against the low side of the wellbore, axial tension or compression forces in the coiled tubing when it transitions around curves in the wellbore and/or axial compressive force in the coiled tubing causing it to helically buckle, typically limit the extent to which coiled tubing can be pushed along the wellbore. Moreover, as coiled tubing systems are deployed from a reel they are not suitable for rotation, which may traditionally be used to reduce frictional effects during deployment.

These and other factors therefore typically limit the extent to which coiled tubing can be utilised in longer extended reach wellbores.

SUMMARY

According to a first aspect, there is provided a coiled tubing system for deployment into a conduit, comprising:

a tubing string comprising a first tubing portion and a second tubing portion configured for coupling to a proximal end of the first tubing portion, the first tubing portion comprising composite coiled tubing and the second tubing portion comprising metallic coiled tubing; and a fluid discharge apparatus configured for location at a distal end of the tubing string, the fluid discharge apparatus comprising:

a body comprising an axial flow passage configured for fluid communication with an axial flow passage of the tubing string;

a lateral flow passage disposed through the body; and a valve arrangement, wherein the fluid discharge apparatus is configured to move between a first configuration in which the valve arrangement obturates fluid communication through the lateral flow passage and a second configuration in which the valve arrangement permits fluid in the axial flow passage to be discharged through the lateral flow passage, said discharge generating a pressure pulse which facilitates transport of the tubing string along the conduit.

Beneficially, the provision of a coiled tubing system having a fluid discharge apparatus in combination with a "hybrid" tubing string comprising composite coiled tubing and metallic coiled tubing facilitates the deployment of coiled tubing systems to a distance (or "reach") not previously attainable using conventional coiled tubing systems. The composite coiled tubing has a lower coefficient of static friction than conventional metallic coiled tubing, e.g. 0.15 compared to 0.25, such that for the same input force the reach of the tubing string can be extended. Moreover, each pressure pulse breaks the contact between the tubing string and the conduit, such that the coefficient of friction between the tubing string and the conduit is changed from a static coefficient of friction to a dynamic coefficient of friction, e.g. 0.1, thereby facilitating further reach along the conduit, such as by an injector arrangement at surface or the like. As will be described further below, the pressure pulse may also provide a local thrust force which acts to pull the tubing string along the wellbore. The fluid discharge apparatus may be configured to cycle between the first configuration and the second configuration. For example, but not exclusively, the fluid discharge apparatus may be configured to cycle between the first configuration and the second configuration between 4 and 10 times per minute.

In use, cycling the fluid discharge apparatus between the first configuration and the second configuration may create discrete phases of fluid build-up and discharge, thereby creating a series of distinct pressure pulses.

As described above, the tubing string includes a first tubing portion comprising composite coiled tubing and a second tubing portion comprising metallic coiled tubing.

The first tubing portion may define a distal portion of the tubing string. Thus, on locating the system in the conduit, the first tubing portion may define a downhole or downstream portion of the tubing string.

The second tubing portion may define a proximal portion of the tubing string. Thus, on locating the system in the conduit, the second tubing portion may define an uphole or upstream portion of the tubing string.

It will be understood that the term proximal means closer to surface and that the term distal means further from surface.

In instances where the conduit comprises a horizontal wellbore, the system may be configured for deployment into the wellbore, with the first tubing portion disposed in the horizontal section of the wellbore and the second tubing portion disposed in the vertical section of the wellbore. The second tubing portion may also be disposed partially in the horizontal section of the wellbore. For example, the system may be deployed into the wellbore until the second tubing portion is disposed around the heel of the wellbore and into the horizontal section of the wellbore.

As described above, the tubing string is configured for deployment into the conduit.

The first tubing portion may be configured for storage on and deployment from a reel. By constructing the first tubing portion from composite coiled tubing, the first tubing portion may be configured to be stored on and deployed from the reel.

The second tubing portion may be configured for storage on and deployment from a reel. By constructing the second tubing portion from metallic coiled tubing, the second tubing portion may be configured to be stored on and deployed from the reel.

In use, the fluid discharge apparatus may be disposed at a distal end of the first tubing portion at surface, the first tubing portion and the fluid discharge apparatus then being deployed into the conduit by unreeling the first tubing portion from the reel. In instances where the conduit comprises a horizontal wellbore, for example, the system may be configured to deploy the fluid discharge apparatus and the first tubing portion into the horizontal section of the wellbore. The first tubing portion may comprise a single run of composite coiled tubing. Alternatively, where required the first tubing portion may comprise a plurality of runs of composite coiled tubing coupled together. The first tubing portion may thus be deployed into the conduit to an initial deployment location, at which the distal end of the tubing string is disposed in the conduit and the proximal end of the first tubing portion is at surface. The second tubing portion may then be coupled to the proximal portion of the first tubing portion, the second tubing portion then being unreeled from the reel.

As an alternative, the first and second tubing portions may be coupled together at surface and deployed into the conduit together.

The first tubing portion may take a number of different forms.

The first tubing portion may comprise a base pipe.

The base pipe may be constructed or formed from a polymeric material.

The polymeric material may be a thermoplastic material.

The thermoplastic material may be at least one of: polyaryletherketone (PAEK); polyarylketone (PAK); polyetherketone (PEK); polyetheretherketone (PEEK); polycarbonate (PC) or the like.

In particular embodiments, the base pipe is constructed or formed from polyetheretherketone (PEEK).

The composite coiled tubing may comprise a composite laminate disposed around the base pipe.

The composite laminate may comprise a matrix.

The matrix may comprise a polymeric material.

The matrix may, for example, comprise a thermoplastic material.

The matrix may comprise at least one of: polyaryletherketone (PAEK); polyarylketone (PAK); polyetherketone (PEK); polyetheretherketone (PEEK); polycarbonate (PC) or the like.

The composite laminate may comprise a plurality of reinforcing elements disposed within the matrix.

The reinforcing elements may be embedded in the matrix.

The reinforcing elements may comprise fibres, strands, filaments, nanotubes or the like.

For example, the reinforcing elements may comprise glass fibres, carbon fibres or the like.

In particular embodiments, the reinforcing elements comprise carbon fibres.

The first tubing portion may have a diameter of between 25 mm (1 inch) and 83 mm (3.25 inches).

The second tubing portion may take a number of different forms.

The second tubing portion may be constructed or formed from steel.

The second tubing portion may have a diameter of between 25 mm (1 inch) and 83 mm (3.25 inches).

The system may comprise a connector arrangement for connecting the first tubing portion and the second tubing portion.

As described above, the fluid discharge apparatus is configured for location at a distal end of the tubing string.

The fluid discharge apparatus may, for example, be configured for coupling to the distal end of the first tubing portion.

The system may comprise a connector for coupling the fluid discharge apparatus to the first tubing portion. The connector may comprise a connector sub. The connector may, for example, comprise a threaded connector or the like. Alternatively or additionally, the connector may be coupled to the first tubing portion and the fluid discharge apparatus by a bond, e.g. an adhesive bond or the like.

As an alternative to the connector, the first tubing portion may be configured to be directly coupled to the fluid discharge apparatus. For example, the first tubing portion may be configured to be directly coupled to the fluid discharge apparatus by a threaded connection. Alternatively or additionally, the first tubing portion may be configured to be directly coupled to the fluid discharge apparatus by a bond, e.g. an adhesive bond or the like.

As a further alternative to the connector, the body of the fluid discharge apparatus may be integrally formed with the first tubing portion.

As described above, the fluid discharge apparatus comprises a valve arrangement, wherein the fluid discharge apparatus is configured to move between a first configuration in which the valve arrangement obturates fluid communication through the lateral flow passage and a second configuration in which the valve arrangement permits fluid in the axial flow passage to be discharged through the lateral flow passage, said discharge generating a pressure pulse which facilitates transport of the tubing string along the conduit.

The valve arrangement may be disposed in the body.

In particular embodiments, the valve arrangement takes the form of a cartridge valve arrangement. The valve arrangement may comprise a valve body disposed in the body of the fluid discharge apparatus, in particular the axial flow passage of the fluid discharge apparatus.

The valve arrangement may comprise a valve member.

The valve member may comprise or take the form of a valve stem.

The valve arrangement may be configured to move between the first configuration and the second configuration in response to fluid pressure.

The valve arrangement may be configured to move between the first configuration and the second configuration passively, that is without external intervention or operation.

The first configuration of the fluid discharge apparatus may define a closed configuration. In the first configuration, the valve arrangement may be configured to obturate the lateral flow passage, such that fluid pressure builds up in the axial flow passage.

The second configuration of the fluid discharge apparatus may define an open configuration. In the second configuration, the valve arrangement may be configured to permit fluid communication through the lateral flow passage, such that fluid pressure in the axial flow passage is discharged into the annulus between the fluid discharge and the conduit.

The apparatus may be configurable in at least one intermediate configuration.

The at least one intermediate configuration may define a partially open configuration.

The apparatus may be configurable in a plurality of intermediate configurations.

The valve arrangement may comprise a piston.

The piston may be disposed in the body.

The piston may be axially movable relative to the body.

The piston may comprise or take the form of a sleeve or spool member.

The valve member, e.g. valve stem, may be disposed in the piston.

The piston may be configured move axially with respect to the valve member.

The valve member, e.g. valve stem, may comprise one or more flow apertures.

The flow apertures of the valve member may be radially oriented.

The piston may comprise one or more flow apertures.

The flow apertures of the piston may be radially oriented.

The fluid discharge apparatus may comprise a chamber.

The fluid discharge apparatus may comprise a seal.

The seal may be a circumferential seal around the piston of the valve arrangement.

Alternatively or additionally, the seal may be a circumferential seal between the piston of the valve arrangement and the body.

The seal may comprise or take the form of a metal-to-metal seal.

The fluid discharge apparatus may comprise a biasing member.

The biasing member may be arranged to urge the valve arrangement to a positon which obturates the lateral flow passage.

The biasing member may, for example, comprise one or more springs.

The springs may, for example, comprise washer springs. In particular embodiments, the springs comprise Belleville springs.

The piston may define an active piston area in the first configuration of the fluid discharge apparatus.

In use, pressure acting on the first active piston area may move the piston.

The piston may be configured to move when pressure acting on the first active piston area exceeds a predetermined opening pressure.

The piston may comprise a second active piston area, and pressure acting on the second active piston area may be operable to move the piston from a partially open position towards the fully open condition.

The second active piston area may be larger than the first active piston area.

The first piston area may be formed on a face on an interior profile of the piston.

The second piston area may be formed on a face on an exterior profile of the piston.

At least one of the piston areas may be annular faces, e.g. conical annular surfaces.

The fluid discharge apparatus may comprise one or more nozzles.

The nozzle, or where a plurality of nozzles are provided at least one of the nozzles, may be radially arranged.

In use, the one or more nozzles may be configured to direct the flow of fluid discharged through the lateral flow passage.

For example, the nozzle, or where a plurality of nozzles are provided at least one of the nozzles, may be arranged to direct fluid discharged from the lateral flow passage in an uphole or upstream direction. Beneficially, this provides a local thrust force urging the tubing string along the conduit.

As described above, the fluid discharge apparatus is configured to generate a pressure pulse which facilitates transport of the tubing string along the conduit The tubing system may comprise a tubing injector. The tubing injector may be configured to apply a push force on the tubing string which urges the tubing string along the conduit.

The tubing system may comprise a pressure control arrangement. The pressure control arrangement may be interposed between the injector and the tubing string.

The tubing string may be disposed through the pressure control arrangement, the pressure control arrangement configured to prevent loss of containment.

As described above, the coiled tubing system facilitates the deployment of coiled tubing systems to total depth in a conduit.

The conduit may take a number of different forms.

The conduit may comprise a wellbore.

In particular embodiments, the conduit comprises an extended reach horizontal wellbore.

Alternatively or additionally, the conduit may comprise one or more of: a pipeline, e.g. a hydrocarbon production or transportation pipeline; a riser, e.g. a marine riser; and an umbilical.

Beneficially, the provision of a coiled tubing system having a fluid discharge apparatus in combination with a "hybrid" tubing string comprising composite coiled tubing and metallic coiled tubing facilitates the deployment of coiled tubing systems to total depth in a conduit, such as an extended reach horizontal, high angle or deviated wellbore (referred to hereinbelow as the horizontal wellbore); in contrast to conventional coiled tubing systems which for the reasons outlined above cannot reach total depth in extended reach horizontal wellbores.

A second aspect relates to a method for deploying a tubing string into a conduit using the coiled tubing system of the first aspect.

The method may comprise coupling the fluid discharge apparatus to a distal end of the first tubing portion.

The method may comprise running the first tubing portion and the fluid discharge apparatus into the conduit.

Running the first tubing portion into the conduit may comprise unreeling the first tubing portion from a reel.

The first tubing portion may be run into the conduit using the injector.

The method may comprise coupling the second tubing portion to the proximal end of the first tubing portion.

The method may comprise running the second tubing portion into the conduit.

Running the second tubing portion into the conduit may comprise unreeling the second tubing portion from a reel.

The second tubing portion may be run into the conduit using the injector.

The method may comprise flowing fluid through the tubing string.

The method may comprise applying a fluid pressure via the tubing string.

The method may comprise pumping fluid from a fluid source through the tubing string to the fluid discharge apparatus.

It will be understood that the features defined above or described below may be utilised in isolation or in combination with any other defined feature.

BRIEF DESCRIPTION OF THE DRAWINGS

These and other aspects will now be described, by way of example, with reference to the accompanying drawings, of which.

DETAILED DESCRIPTION OF THE DRAWINGS

Figure 1:
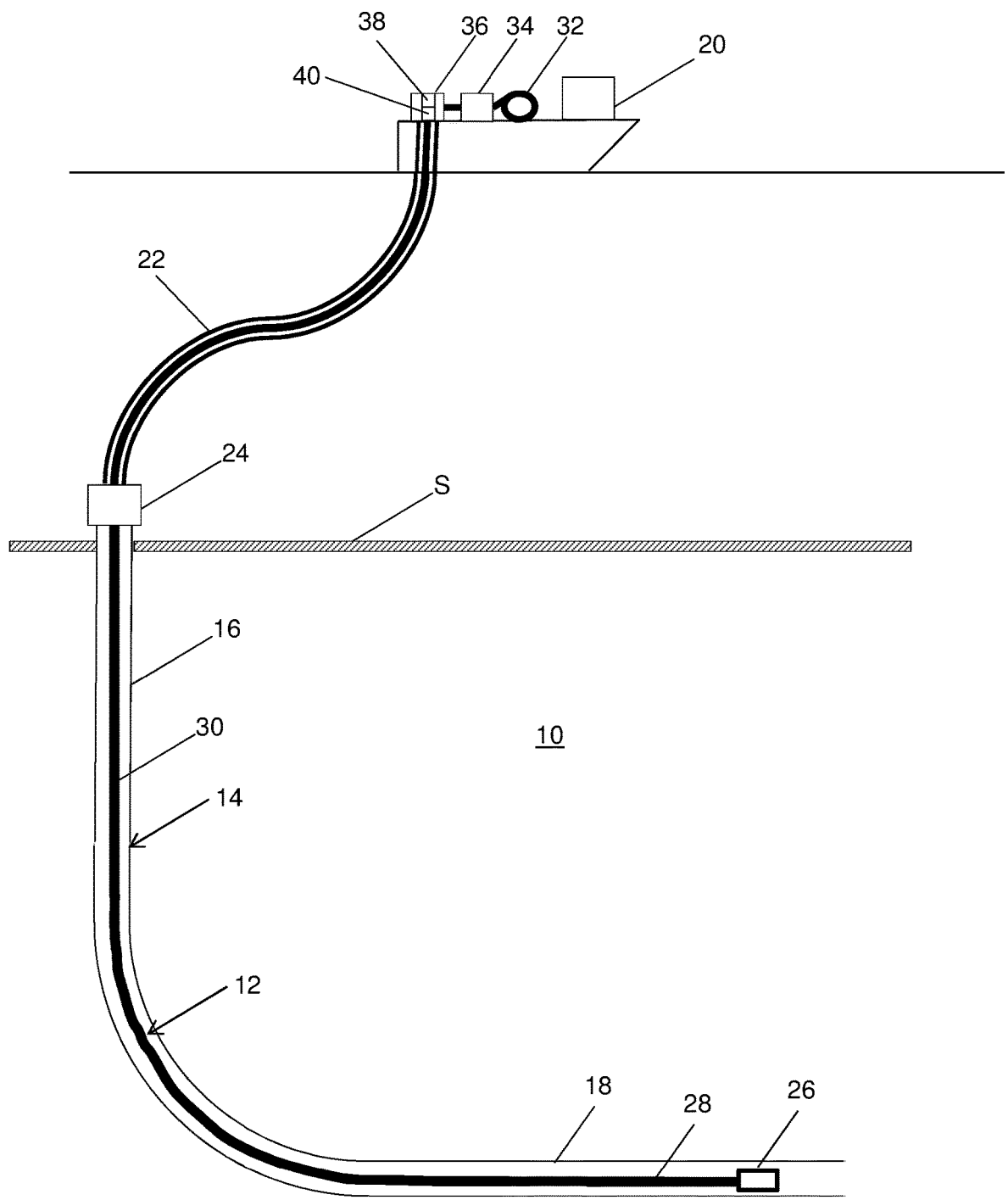
FIG. 1 shows a schematic view of a coiled tubing system.

Referring first to FIG. 1 of the accompanying drawings, there is shown a coiled tubing system, generally depicted at 10, for use in deploying a tubing string 12 into a conduit 14.

In the illustrated system 10, the conduit 14 takes the form of an extended reach horizontal wellbore having a vertical section 16 and a horizontal section 18, the conduit 14 being accessible from intervention vessel 20 via a marine riser 22 coupled to wellhead 24 disposed at the seabed S.

As shown in FIG. 1, the system 10 includes the tubing string 12 and a fluid discharge apparatus 26, the fluid discharge apparatus 26 disposed at a distal end of the tubing string 12.

The tubing string 12 includes a first tubing portion 28 comprising composite coiled tubing and a second tubing portion 30 comprising metallic coiled tubing, the fluid discharge apparatus 26 coupled to a distal end of the first tubing portion 28.

In the illustrated system 10, the first tubing portion 28 has a base pipe constructed or formed from polyetheretherketone (PEEK) and has a composite laminate disposed around the base pipe, the composite laminate constructed or formed from a plurality of carbon fibre reinforcing elements disposed within a matrix constructed or formed from polyetheretherketone (PEEK) and the second tubing portion 30 is constructed or formed from steel.

In use, and as will be described further below, the system 10 is configured to deploy the tubing string 12 and the fluid discharge apparatus 26 into the conduit 14, the fluid discharge apparatus 26 operable to generate pressure pulses which facilitate transport of the tubing string 12 along the conduit 14.

Beneficially, the provision of a coiled tubing system 10 having a fluid discharge apparatus 26 in combination with a "hybrid" tubing string 12 comprising composite coiled tubing and metallic coiled tubing facilitates the deployment of coiled tubing systems to a distance not previously attainable using conventional coiled tubing systems.

In use, the tubing string 12 is deployed from a reel 32 using an injector apparatus 34. Before passing into the riser 22, the tubing string 12 passes through a pressure control arrangement 36 which, in the illustrated system 10 comprises a stripper 38 and a blowout preventer 40.

Figure 2:
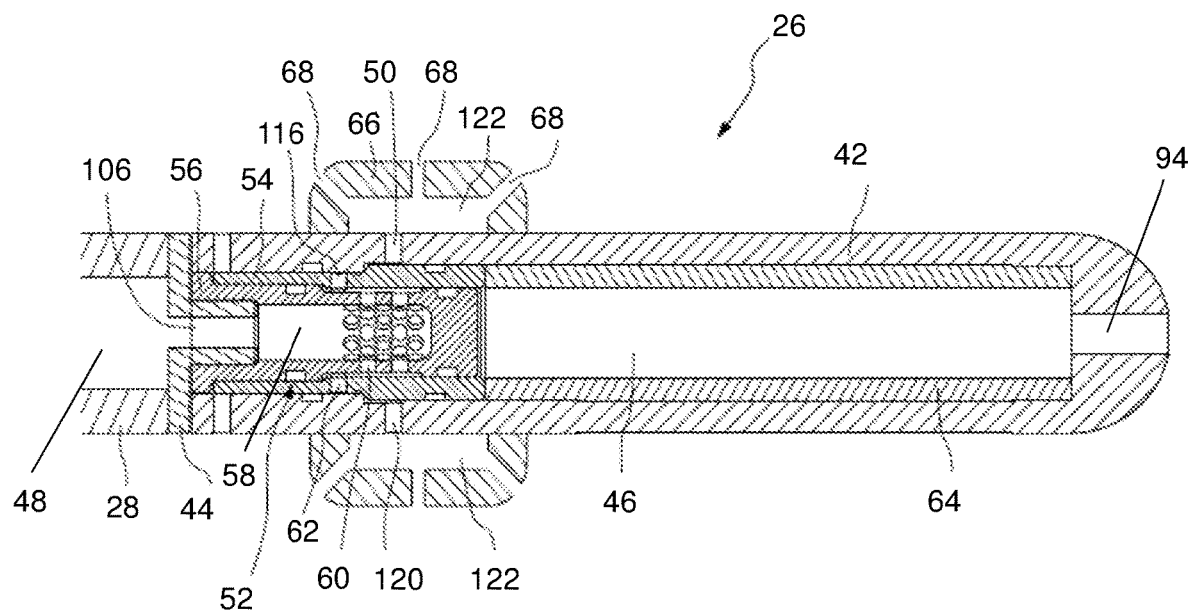
FIG. 2 shows a sectional view of the fluid discharge apparatus of the tubing system shown in FIG. 1.

Referring now also to FIG. 2 of the accompanying drawings, there is shown an enlarged longitudinal section view of a distal end portion of the system 10.

As shown in FIG. 2, the fluid discharge apparatus 26 comprises a body 42 which is coupled to the distal end of the first tubing portion 28 by a connector 44. The body 42 defines an axial flow passage 46 which in the illustrated system 10 takes the form of a bore. The axial flow passage 46 communicates with an axial flow passage 48 of the tubing string 12.

A lateral flow passage 50 is provided through the body 42. In the illustrated fluid discharge apparatus 26, the lateral flow passage 50 take the form of a plurality of radial ports extending through the body 42.

A valve arrangement 52 is disposed within the bore 46 of the body 42. In the illustrated fluid discharge apparatus 26, the valve arrangement 52 takes the form of a cartridge valve arrangement disposed within the body 42 of the fluid discharge apparatus 26.

As will be described further below, the fluid discharge apparatus 26 is configured to move between a first configuration in which the valve arrangement 52 obturates fluid communication through the lateral flow passage 50 and a second configuration in which the valve arrangement 52 permits fluid in the axial flow passage 46 to be discharged through the lateral flow passage 50, said discharge generating a pressure pulse which facilitates transport of the tubing string 12 along the conduit 14.

As shown in FIG. 2, the valve 52 comprises a piston 54. The piston 54 is disposed within the body 42 and is configured to move axially relative to the body 42.

A valve stem 56 is disposed within the piston 54. The valve stem 56 defines an internal cavity 58 which receives pressurised fluid from the tubing string 12. The valve stem 56 comprises radial apertures 60 which provide fluid communication between the cavity 58 and the outer surface of the valve stem 56. The radial apertures 60 are distributed axially and circumferentially. The piston 54 comprises radial apertures 62, distributed circumferentially around the piston 54. Thus, it can be seen that the cavity 58 is in fluid communication with the exterior of the piston 54 via the apertures 60,62.

As shown in FIG. 2, a biasing member 64 is disposed in the body 42, the biasing member 64 engaging an end of the piston 54. The biasing member 64 biases the piston 54 towards the position shown in FIG. 2 (to the left as shown in FIG. 2) in which the piston 54 obturates the lateral flow passage 50 and thus maintains the fluid discharge apparatus 26 in its first configuration. In the illustrated fluid discharge apparatus 26, the biasing member 64 takes the form of a plurality of spring washers.

A nozzle arrangement 66 is disposed around the body 42, and more particularly around the lateral flow passage 50. The nozzle arrangement 66 comprises a number of nozzles 68. The nozzle arrangement 68 facilitates fluid jetting from the fluid discharge apparatus 26, for example to perform a cleaning operation, fracturing operation, chemical wash operation or the like. The nozzle arrangement 26 is configurable at surface by varying nozzle sizes and/or blanking off one or more of the nozzles 68, e.g. with threaded inserts (not shown).

Figure 3:
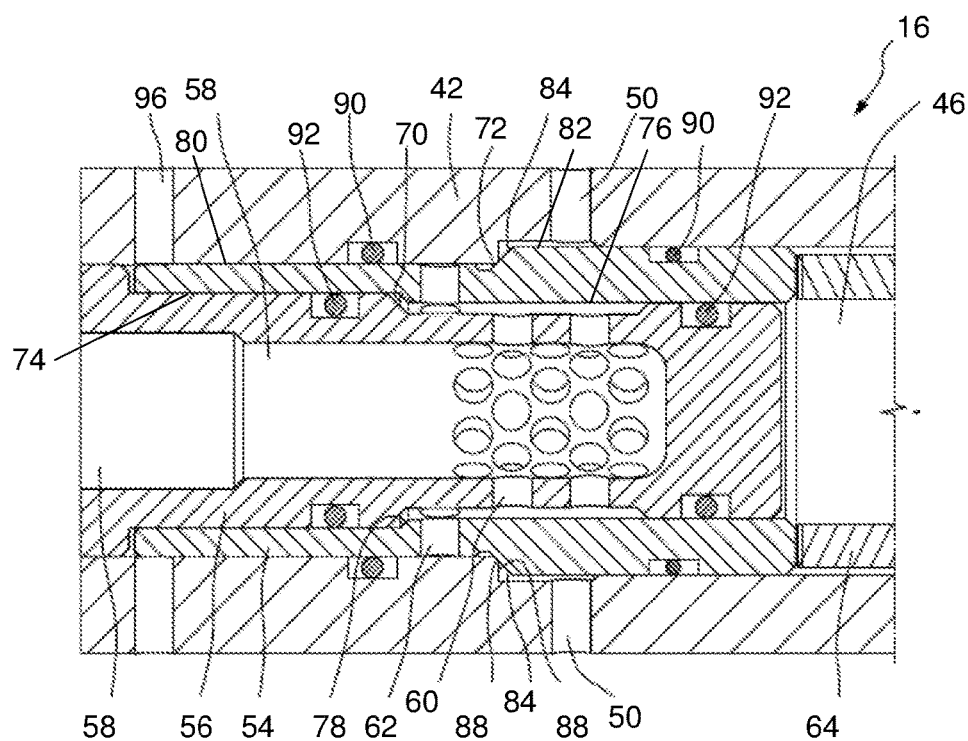
FIG. 3 shows an enlarged view of part of the fluid discharge apparatus shown in FIG. 2.

Referring now also to FIG. 3 of the accompanying drawings, there is shown an enlarged view of the part of the fluid discharge apparatus 26 shown in FIG. 2. For ease of reference, the nozzle arrangement 66 is not shown.

As shown in FIG. 3, the piston 54 takes the form of a cylindrical sleeve with internal and external stepped profiles 70, 72. The internal stepped profile 70 comprises a first portion 74 with a first inner diameter, and a second portion 76 with a second, reduced inner diameter. Between the first and second portions 70,72 is a conical face 78 which defines a first active piston area of the piston 54. The external stepped profile 72 comprises a first portion 80 with a first outer diameter and a second portion 82 with a second, greater, outer diameter. Between the first and second portions 80,82 is an exterior conical face 84 which provides a second active piston area of the piston 54. As shown in FIG. 3, a chamber 86 is formed between the piston 54 and the body 42, the chamber 86 communicating with the lateral flow passage 50. The conical face 84 also provides a sealing surface for a metal-to-metal seal between the piston 54 and a shoulder 88 in the body 42. The exterior conical face 84 is selected to be larger than the interior conical face 78, such that the second active piston area is larger than the first active piston area.

Seal elements 90, which in the illustrated fluid discharge apparatus 26 take the form of elastomeric seals, are provided between the piston 54 and the body 42. Seal elements 92, which in the illustrated fluid discharge apparatus 26 take the form of elastomeric seals, are provided between the valve stem 56 and the piston 54.

A port 94 is provided in a distal end portion of the body 42, the port 94 pressure balancing the bore and spring cavity. Ports 96 in the body 42 pressure balance the fluid discharge apparatus 26, and allow the piston 54 to move between its respective operating positions, as will be described below.

In use, the fluid discharge apparatus 26 is configured to discharge fluid via the nozzles 68 into the conduit 14 when a pressurised fluid is provided to the fluid discharge apparatus 26 via the tubing string 12.

The discharged fluid creates fluid jets which are directed towards material such as wax, scale, and/or other deposits in the fluid conduit to physically dislodge or loosen it from the fluid conduit.

The nozzles may also be directed towards the rear of the tool to provide forward thrust to move the assembly forwards in the pipeline.

Operation of the fluid discharge apparatus 26 will now be described with reference to FIGS. 4 to 12 of the accompanying drawings. For clarity, some components of the fluid discharge apparatus 26 are not shown.

Figure 4:
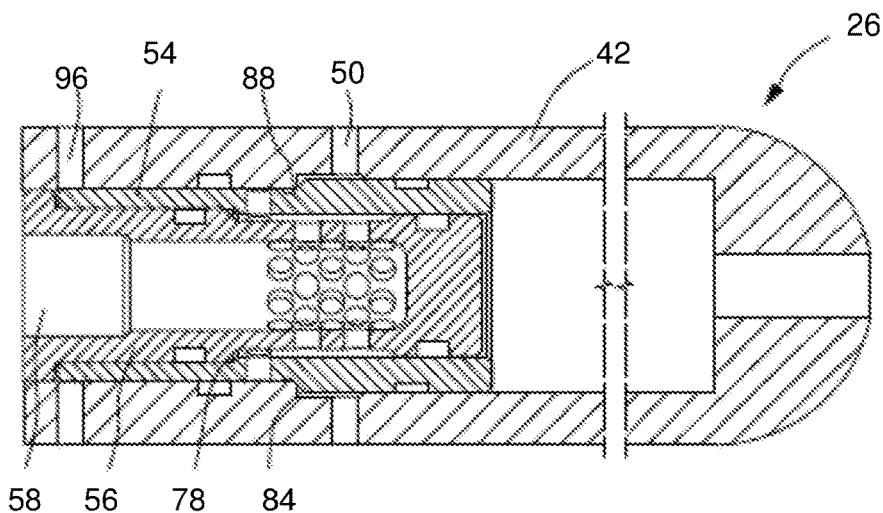
FIGS. 4 to 12 show operation of the fluid discharge apparatus.

FIG. 4 shows the fluid discharge apparatus 26 in the first, closed, configuration in which the valve arrangement 52 prevents fluid flow through the lateral flow passage 50. The cavity 58 is in fluid communication with the tubing string 12 which receives fluid pumped from a fluid source at an elevated pressure (higher than the ambient pressure in the pipeline). Fluid pressure acts on the face 78 which defines the first active piston area. However, in this configuration the fluid pressure acting on the face 78 is insufficient to overcome the bias of the biasing member 64.

Figure 5:
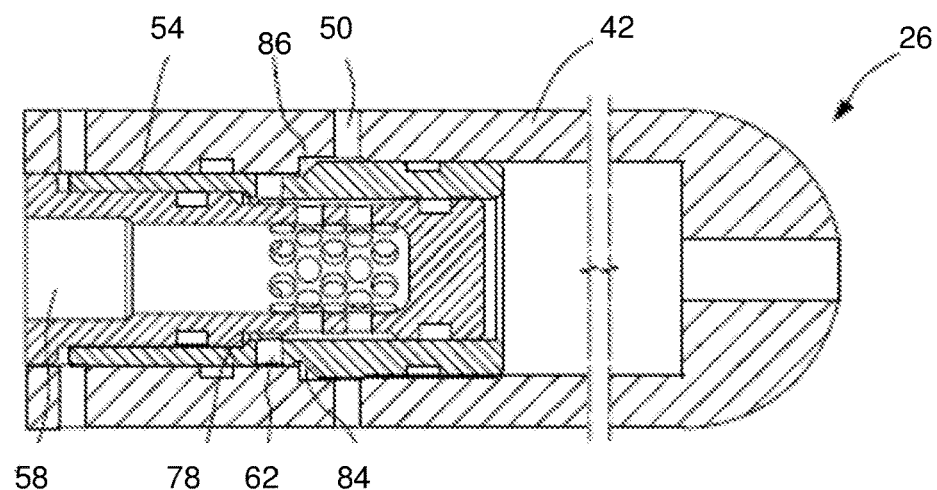

FIG. 5 of the accompanying drawings shows the fluid discharge apparatus 26 in a condition in which the pressure has increased to a level at which the pressure force on the active piston area overcomes the bias of the biasing member 64. As shown in FIG. 5, the piston 54 has moved axially relative to the body 42 and the valve stem 56 (to the right as shown in FIG. 5). In this position, the metal-to-metal seal is broken.

Figure 6:
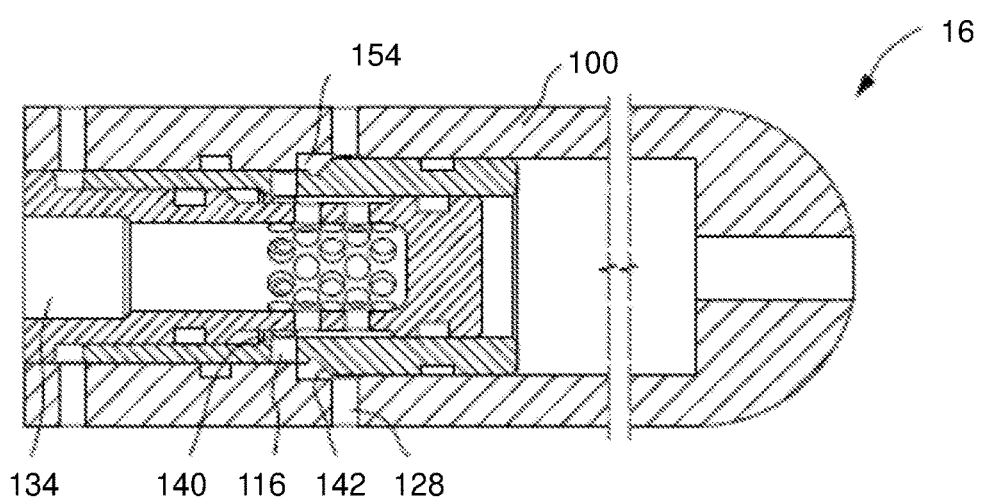

FIG. 6 of the accompanying drawings shows the fluid discharge apparatus 26 in a partially open condition. The applied fluid pressure has reached a threshold required to move the piston 54 to a position at which the radial apertures 60 are in direct fluid communication with chamber 86. At this stage, the fluid flow rate from the cavity 58 to the lateral flow passage 50 increases rapidly. Chamber 864 becomes pressurised, resulting in an overall drop in pressure within the fluid discharge apparatus 26. However, with the chamber 86 pressurised, the second active piston area (defined by surface 84) becomes active. The force on the piston 54 is sufficient to continue to move the piston against the biasing member 64 (to the right as shown in the drawings), providing that the internal pressure does not drop below a 'set close' pressure threshold. In this condition, the flow rate is initially small and the internal pressure is initially high.

Figure 7:
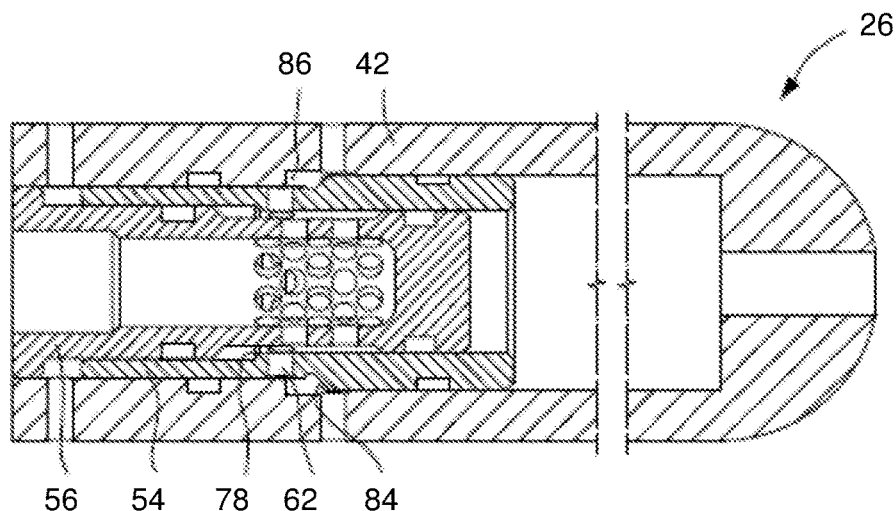

FIG. 7 of the accompanying drawings shows the fluid discharge apparatus 26 in a partially open condition, in which the piston 54 has moved further against the biasing member 64. As the piston 54 moves, the rate of change of the flow rate decreases, and the internal pressure reduces. The radial flow path through the fluid discharge apparatus 26 increases as the apertures 62 moves into alignment with the chamber 86.

Figure 8:
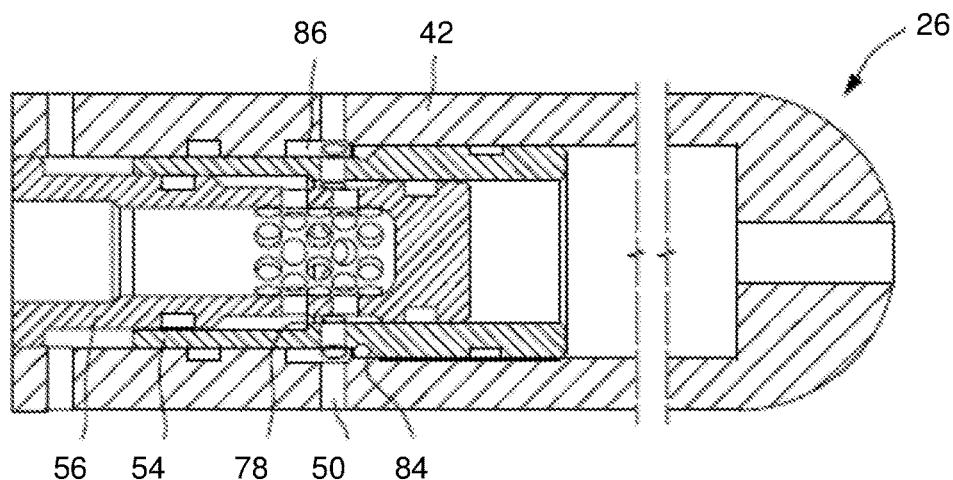

FIG. 8 of the accompanying drawings shows the fluid discharge apparatus 26 in a fully open condition. The fluid discharge apparatus 26 remains in this condition while the internal pressure exceeds a critical 'set close' pressure, at which the hydrostatic load on the piston faces 78,84 is less than the bias of the biasing member 64. The flow rate in this condition is relatively high.

Figure 9:
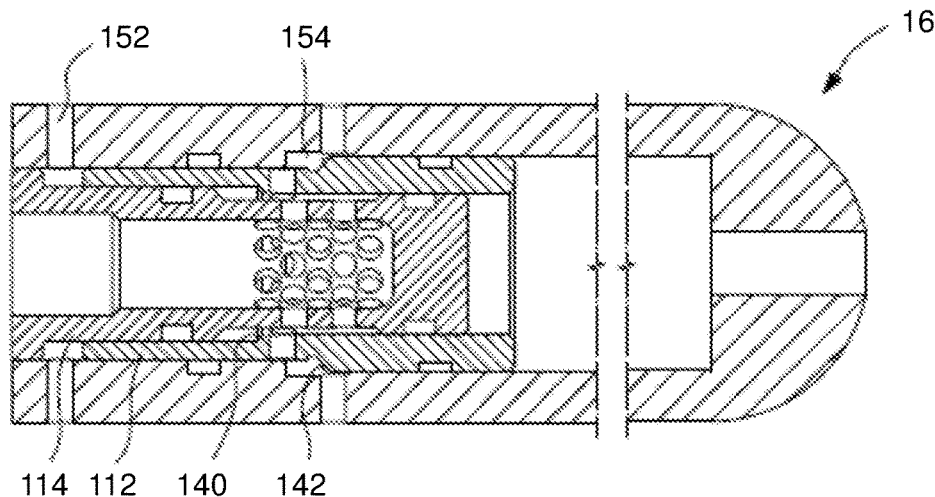

FIG. 9 of the accompanying drawings shows the fluid discharge apparatus 26 in a condition at which the critical 'set close' pressure has been reached. In this condition, the bias of the biasing member 64 now exceeds the hydrostatic load on the piston faces 78,84, and the piston 54 begins to move towards the valve stem 56 (to the left as shown in the drawings) as the pressure continues to drop. The radial flow path area from the cavity 58 to the exterior of the fluid discharge apparatus 26 begins to reduce and become more restricted, while the flow rate is still relatively high. This results in an increasing pressure drop across the piston 54 between the cavity 58 and the pressure acting on the piston area defined by face 84 in the chamber 86, reducing the relative pressure acting on the piston area defined by face 84. Conversely, the relative pressure acting on the piston area defined by face 78 increases, relative to the pressure in the chamber 86. However, as the active second piston area defined by face 84 is significantly larger than the first active piston area defined by face 78, the net hydrostatic force on the piston 54 continues to reduce, and the bias of the biasing member 64 continues to move the piston 54 towards the valve stem 56. As the piston 54 moves towards the valve stem 54 fluid exits through ports 94.

Figure 10:
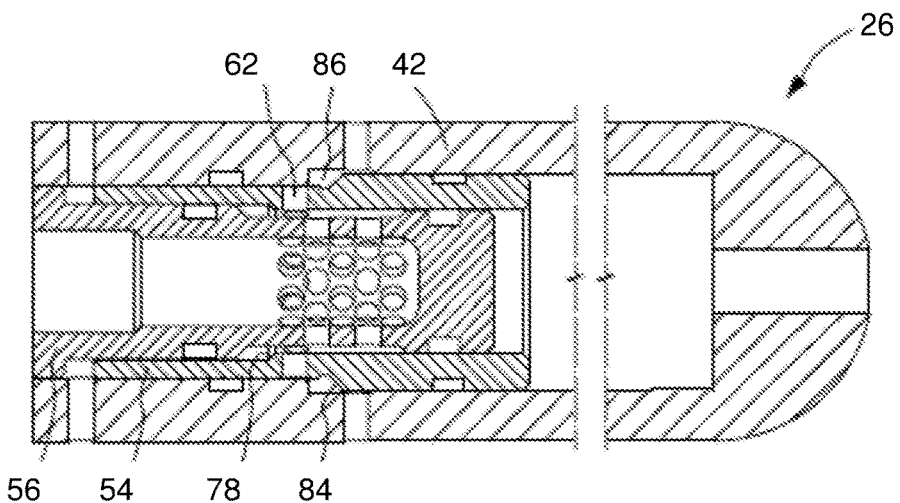

FIG. 10 of the accompanying drawings shows the fluid discharge apparatus 26 in a partially closed condition, in which the apertures 62 of piston 54 are not in direct fluid communication with the chamber 86. The chamber 86, the lateral flow passage 50 and the nozzle arrangement 66 discharge to the ambient pipeline pressure. In this condition, the flow rate is initially high, and the internal pressure is initially low compared to the condition shown in FIG. 6 in the opening phase of the cycle. The fluid continues to be pumped from the fluid source, and although the pressure in the tubing string 12 and cavity 58 increases, the pressure only acts on the piston area of face 78. This piston area is relatively small, and is overcome by the bias of the biasing member 64.

Figure 11:
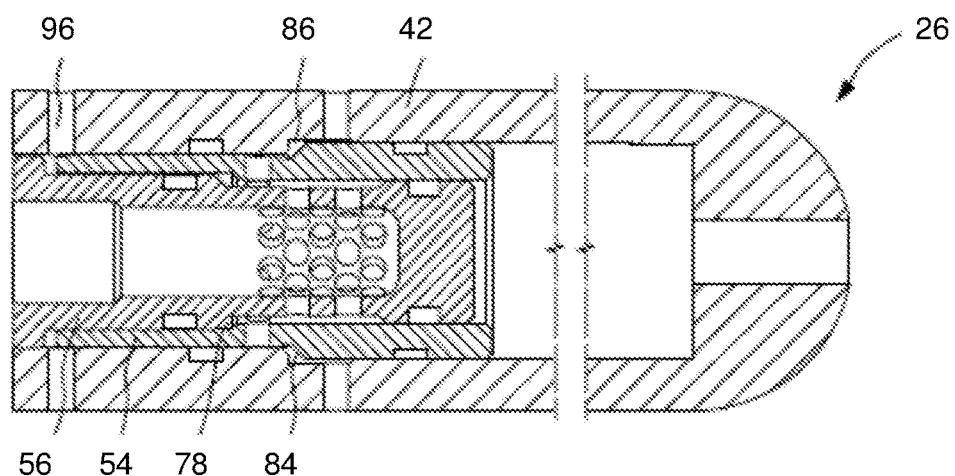

FIG. 11 of the accompanying drawings shows the fluid discharge apparatus 26 in a partially closed condition. As the piston 54 moves towards the valve stem 56 and towards a closed position, the flow path between the chamber 86 and the lateral flow passage 50 is obturated. This provides a degree of hydraulic dampening or cushioning as the piston 54 approaches the point of contact of the metal-to-metal seal, to reduce the impact on the metal seal and increase its longevity. Ports 94 are also restricted to provide hydraulic dampening between the piston 54 and the valve stem 56.

Figure 12:
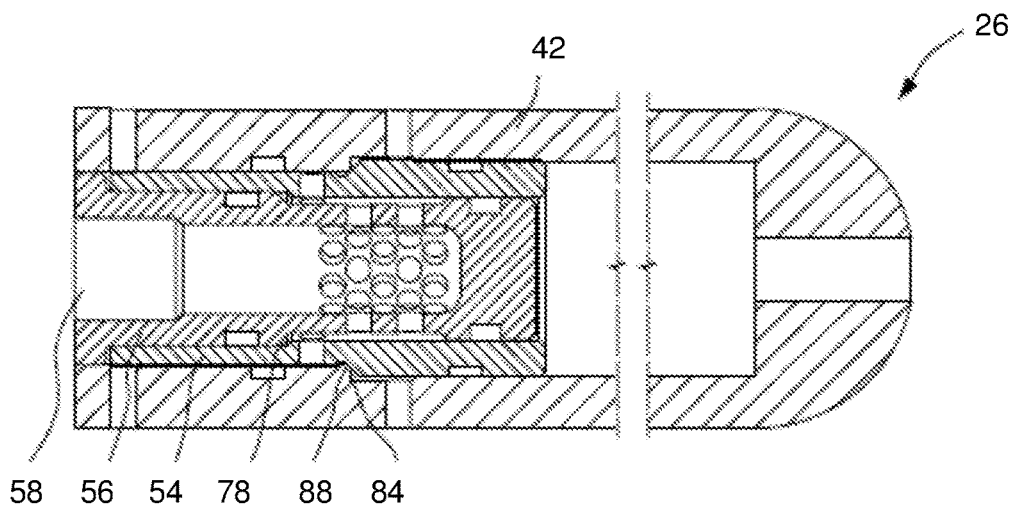

FIG. 12 of the accompanying drawings shows the fluid discharge apparatus 26 in its fully closed condition, at the end of the cycle. This condition is the same as the condition in FIG. 4, and no flow is permitted through the fluid discharge apparatus 26. Fluid continues to be is pumped from the fluid source, and the cycle begins again with the internal pressure in the cavity 58 increasing as described with reference to FIG. 4.

As described above, the provision of a coiled tubing system 10 having a fluid discharge apparatus 26 in combination with a "hybrid" tubing string 12 comprising composite coiled tubing and metallic coiled tubing facilitates the deployment of coiled tubing systems to a distance (or "reach") not previously attainable using conventional coiled tubing systems. The composite coiled tubing has a lower coefficient of static friction than conventional metallic coiled tubing, e.g. 0.15 compared to 0.25, such that for the same input force the reach of the tubing string can be extended. Moreover, each pressure pulse breaks the contact between the tubing string 12 and the conduit 14, such that the coefficient of friction between the tubing string and the conduit is changed from a static coefficient of friction to a dynamic coefficient of friction, e.g. 0.1, thereby facilitating further reach along the conduit, such as by an injector arrangement at surface or the like. The pressure pulse may also provide a local thrust force which acts to pull the tubing string 12 along the conduit 14.

Referring again to FIG. 1 of the accompanying drawings, in use, the fluid discharge apparatus 26 is disposed at a distal end of the first tubing portion 28 at surface, the first tubing portion 28 and the fluid discharge apparatus 26 then being deployed into the conduit 14 by unreeling the first tubing portion 28 from a reel. In the illustrated system 10, the fluid discharge apparatus 26 and the first tubing portion 28 are deployed into the horizontal section 18. The first tubing portion 28 may comprise a single run of composite coiled tubing. Alternatively, where required the first tubing portion 28 may comprise a plurality of runs of composite coiled tubing coupled together. The first tubing portion 28 is thus deployed into the conduit 14 to an initial deployment location, at which the distal end of the first tubing portion 28 is disposed in the conduit 14 and the proximal end of the first tubing portion 28 is at surface. The second tubing portion 30 is then coupled to the proximal portion of the first tubing portion 28, the second tubing portion 30 then being unreeled from reel 32 to further deploy the tubing string 12 into the conduit 14.

During running, the fluid discharge apparatus 26 is operated to facilitate transport of the tubing string 12 to a distance not previously attainable using conventional coiled tubing systems.

As described above, in addition to facilitating transport of the tubing string 12, the system 10 is operable to perform an intervention operation, such as a cleaning operation, fracturing operation or chemical wash or the like.

It will be recognised that the system 10 described above is merely exemplary and that various modifications may be made without departing from the scope of the claimed invention as defined by the appended claims.

The invention claimed is:

1. A coiled tubing system for deployment into a conduit, comprising:
   a tubing string comprising a first tubing portion and a second tubing portion configured for coupling to a proximal end of the first tubing portion, the first tubing portion comprising composite coiled tubing and the second tubing portion comprising formed of metal piping; and
   a fluid discharge apparatus configured for location at a distal end of the tubing string, the fluid discharge apparatus comprising:
   a body comprising an axial flow passage configured for fluid communication with an axial flow passage of the tubing string;
   a lateral flow passage disposed through the body; and
   a valve arrangement,
   wherein the fluid discharge apparatus is configured to move between a first configuration in which the valve arrangement obturates fluid communication through the lateral flow passage and a second configuration in which the valve arrangement permits fluid in the axial flow passage to be discharged through the lateral flow passage, said discharge generating a pressure pulse which facilitates transport of the tubing string along the conduit.

2. The system of claim 1, wherein the fluid discharge apparatus is configured to cycle between the first configuration and the second configuration.

3. The system of claim 1, wherein the first tubing portion comprises a base pipe.

4. The system of claim 3, wherein the base pipe is constructed or formed from one of:
   a polymeric material;
   a thermoplastic material;
   a thermoplastic material comprising at least one of: polyaryletherketone (PAEK); polyarylketone (PAK); polyetherketone (PEK); polyetheretherketone (PEEK); and polycarbonate (PC).

5. The system of claim 3, wherein the composite coiled tubing comprises a composite laminate disposed around the base pipe.

6. The system of claim 5, wherein the composite laminate comprises a matrix and a plurality of reinforcing elements disposed within the matrix.

7. The system of claim 6, wherein the matrix comprises one of:
- a polymeric material;
- a thermoplastic material;
- a thermoplastic material comprising at least one of: polyaryletherketone (PAEK); polyarylketone (PAK); polyetherketone (PEK); polyetheretherketone (PEEK); and polycarbonate (PC).

8. The system of claim 6, wherein the reinforcing elements comprise at least one of: fibres; strands; filaments; or nanotubes.

9. The system of claim 8, wherein the reinforcing elements comprise carbon fibres.

10. The system of claim 1, wherein the second tubing portion is constructed or formed from steel.

11. The system of claim 1, wherein the valve arrangement comprises a valve member comprising one or more flow apertures for providing fluid communication from the axial flow passage of the fluid discharge apparatus to the lateral flow passage.

12. The system of claim 1, wherein the fluid discharge apparatus is configured to move from the first configuration to the second configuration in response to fluid pressure.

13. The system of claim 1, wherein the valve arrangement comprises a piston axially movable relative to the body, wherein in the first configuration the piston obturates the lateral flow passage and in the second configuration the piston permits fluid communication from the axial flow passage through the lateral flow passage.

14. The system of claim 13, wherein the piston comprises one or more flow apertures.

15. The system of claim 1, wherein the fluid discharge apparatus comprise a biasing member configured to urge the fluid discharge apparatus to the first configuration.

16. The system of claim 1, comprising a tubing injector configured to apply a push force on the tubing string which urges the tubing string along the conduit.

17. A method for deploying a tubing string into a conduit using the coiled tubing system according to claim 1, the method comprising:
- (i) at least one of:
  - coupling the fluid discharge apparatus to the distal end of the first tubing portion, or running the first tubing portion and the fluid discharge apparatus into the conduit;
- (ii) at least one of:
  - coupling the second tubing portion to the proximal end of the first tubing portion, or running the second tubing portion into the conduit; or
- (iii) applying a fluid pressure via the tubing string to reconfigure the fluid discharge apparatus from the first configuration to the second configuration.

* * * * *